United States Patent [19]

Ohara et al.

[11] Patent Number: 4,905,904
[45] Date of Patent: Mar. 6, 1990

[54] WASHING LIQUID JET DEVICE FOR AUTOMOBILE WINDSHIELD

[75] Inventors: Sosaburo Ohara, Machida; Takaaki Katakura, Yokohama, both of Japan

[73] Assignee: Taiho Industries Co., Ltd., Tokyo, Japan

[21] Appl. No.: 221,287

[22] Filed: Jul. 19, 1988

[30] Foreign Application Priority Data

Feb. 17, 1988 [JP] Japan .............................. 63-18643[U]

[51] Int. Cl.⁴ ........................... B05B 1/10; B67B 7/46
[52] U.S. Cl. .................................. 239/284.1; 239/309; 222/88; 215/309
[58] Field of Search ........................... 222/86, 88, 81; 215/309; 220/374, 313; 239/284.1, 284.2, 309

[56] References Cited

U.S. PATENT DOCUMENTS 2,545,826  3/1951  O'Hara et al. ..................... 222/86
2,914,256  1/1959  O'Shei ............................ 239/284.1
3,198,437  8/1965  Faghi ............................. 239/309
3,286,932  11/1966 Kibbir ............................ 239/284.1

FOREIGN PATENT DOCUMENTS

1031152  5/1958  Fed. Rep. of Germany ... 239/284.1
3015348  11/1980 Fed. Rep. of Germany ... 239/284.1
1204371  9/1970  United Kingdom ............ 239/284.1

Primary Examiner—Andres Kashnikow
Assistant Examiner—Kevin P. Weldon
Attorney, Agent, or Firm—Oblon, Spivak, McClelland, Maier & Neustadt

[57] ABSTRACT

A washing liquid jet device for an automobile window glass is disclosed, which comprises a first pumping unit for pumping a liquid in a first vessel, a second pumping unit for pumping a liquid in a second vessel, and a joining chamber having a first flow path and a second flow path. A unidirectional valve is provided at each of the joining chamber inlets of the flow paths such that it permits flow of liquid into the chamber but blocks the flow of liquid out of the chamber. A discharge side flow path of the first pumping unit is connected to the first flow path of the joining chamber, the discharge side flow path of the second pumping unit is connected to the second flow path of the joining chamber, and the outlet of the joining chamber is connected to one end of a feed-out duct, the other end of which is connected to a jet nozzle.

5 Claims, 5 Drawing Sheets

WASHING LIQUID JET DEVICE FOR AUTOMOBILE WINDSHIELD

BACKGROUND OF THE INVENTION

1. Field of the Invention

This invention relates to a washing liquid jet device for an automobile windshield, which jets a washing liquid against an automobile windshield or the like.

2. Prior Art Statement

As is well known in the art, when an automobile windshield becomes dirty with mud or dust, a washing liquid is jetted against the windshield by operating a washing liquid jet device called a windshield washer and then wiping off the washing liquid with a wiper. In the prior art washing liquid jet device, a vessel, in which the washing liquid is stored, is installed in the engine compartment, and by operating a switch at the driver's seat, a pump is operated so that the washing liquid in the vessel is jetted from a nozzle provided on the bonnet against the windshield. The washing liquid is usually prepared by diluting with water a washing liquid containing a small amount of a surface active agent.

When the windshield becomes dirty with mud, it can be cleaned sufficiently by merely washing it with the diluted solution. In such a case, therefore, it is only necessary to be able to jet the diluted solution. However, sometimes an oil film adheres to the windshield. Such an oil film can be removed solely with the diluted solution only with difficulty, and it is desirable to jet a liquid surface active agent (e.g., a liquid soap) and then wipe it away with a wiper.

The prior art washing liquid jet device includes only a single vessel, so that the vessel can be filled with only either the diluted solution or the liquid surface active agent. If two vessels are provided or if a dual system consisting of two washing liquid jet devices is provided, it is necessary to provide an electromagnetic valve or two nozzles, thus complicating the construction.

OBJECT OF THE INVENTION

An object of the invention is to provide a washing liquid jet device for an automobile windshield which is simple in structure and has two vessels to permit jetting of two different liquids against a windshield either independently or simultaneously.

SUMMARY OF THE INVENTION

According to the invention, there is provided a washing liquid jet device for an automobile windshield which comprises a first pumping unit for pumping out a liquid from a first vessel, a second pumping unit for pumping out a liquid from a second vessel, and a joining chamber with first and second flow paths each provided with a unidirectional valve for permitting flow of liquid into the chamber but blocking flow of liquid out of the chamber. A discharge side flow path of the first pumping unit is connected to the first flow path of the joining chamber, a discharge side flow path of the second pumping unit is connected to the second flow path of the joining chamber, and an outlet of the joining chamber is connected to one end of a feed-out duct having the other end connected to a jet nozzle.

With this structure, by operating only the first pumping unit, the liquid in the first vessel flows from the first flow path into the joining chamber and is thence jetted through a feed-out duct from the jet nozzle. Since at this time the unidirectional valve at the second flow path of the joining chamber is closed. Only the liquid in the first vessel is jetted from the jet nozzle.

Similarly, by operating only the second pumping unit, alone the liquid in the second vessel is caused to flow from the second flow path into the joining chamber. Since at this time the unidirectional valve at the first flow path is closed, only the liquid in the second vessel is jetted from the jet nozzle.

Further, when both the first and second pumping units are operated, the liquids in the respective first and second vessels are caused to flow through the first and second flow paths into the joining chamber. Thus, in the joining chamber the liquids from the first and second vessels are mixed together, and the resultant mixture is jetted out through the feed-out duct from the jet nozzle.

In the above way, with the washing liquid jet device according to the invention, two different liquids can be readily jetted, so that it is possible to maintain the windshield clean at all time to ensure safe driving by appropriately selecting the liquid to be jetted against the windshield depending on the state of contamination thereof.

The other objects and features of the invention will become more apparent from the following detailed description with reference to the accompanying drawings.

DETAILED DESCRIPTION OF THE PREFERRED EMBODIMENT

Figure 1:
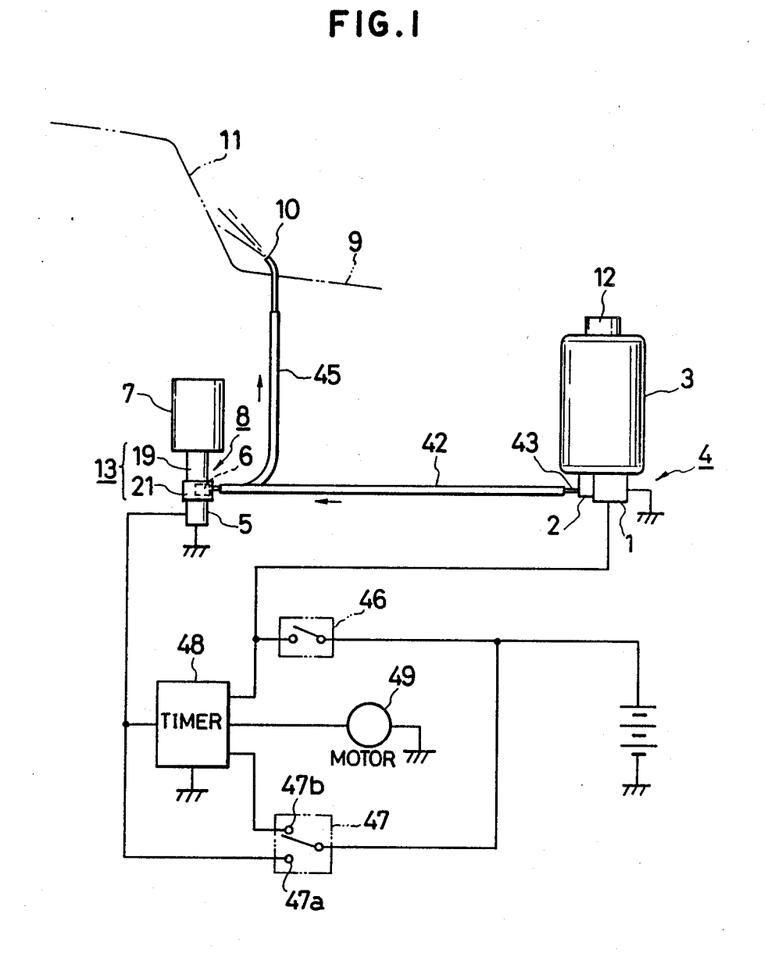
FIG. 1 is a schematic representation of a washing liquid jet device for an automobile windshield according to the invention, also showing the wiring and piping.

FIG. 1 shows an embodiment of the washing liquid jet device according to the invention applied to a bonnet type passenger car. In the engine compartment, there are provided a first pumping unit 4 integrally including a first motor 1, a first pump 2 and a first vessel 3, and a second pumping unit 8 including a second motor 5, a second pump 6 and a second vessel 7 detachable from the second pumping unit 8. A jet nozzle 10 is provided at the top of a bonnet 9 at a suitable position thereof with its jet port directed toward a windshield 11.

In the first pumping unit 4, the first pump 2 and the first motor 1 for driving the first pump 2 are mounted integrally on the bottom of the first vessel 3 which is to be filled with a first liquid e.g., water. The first liquid can be charged into the first vessel 3 by opening a lid 12 provided on top of the first vessel 3.

Figure 2:
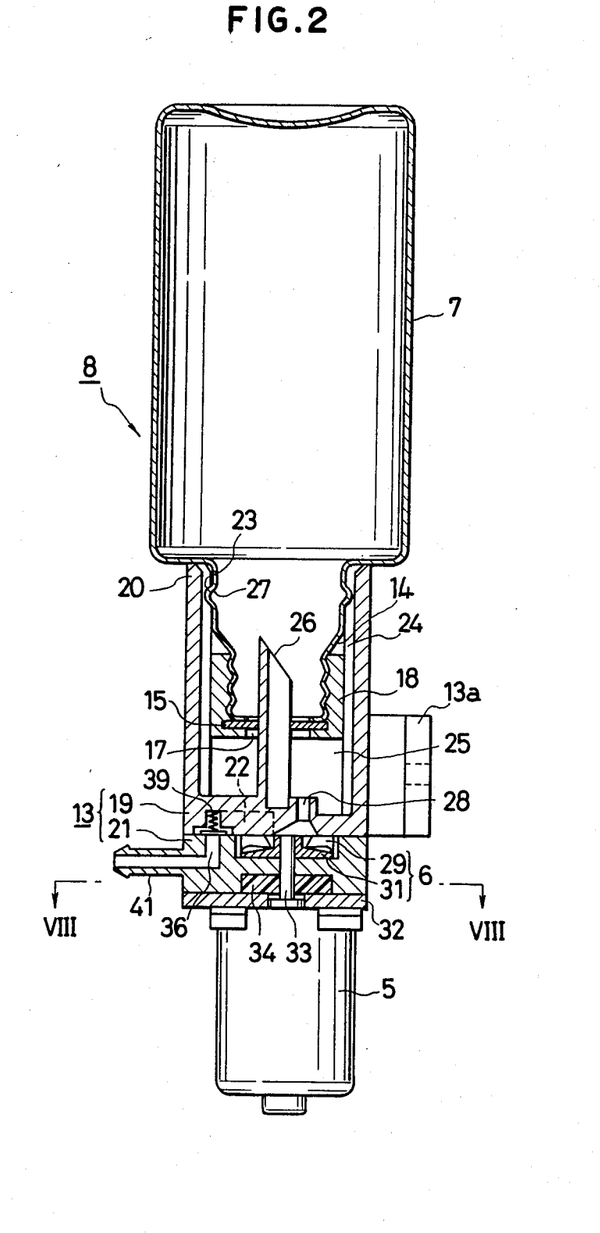
FIG. 2 is a fragmentary sectional view showing a second pumping unit of the device shown in FIG. 1.
Figure 3:
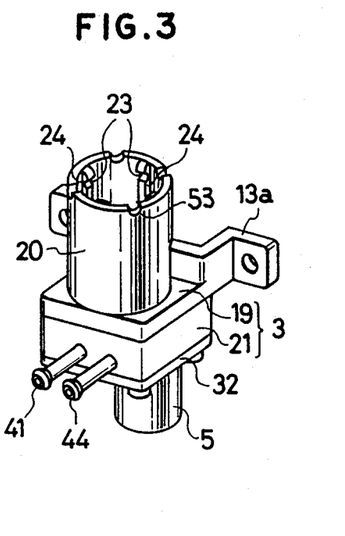
FIG. 3 is a perspective view showing the second pumping unit shown in FIG. 2.
Figure 5:
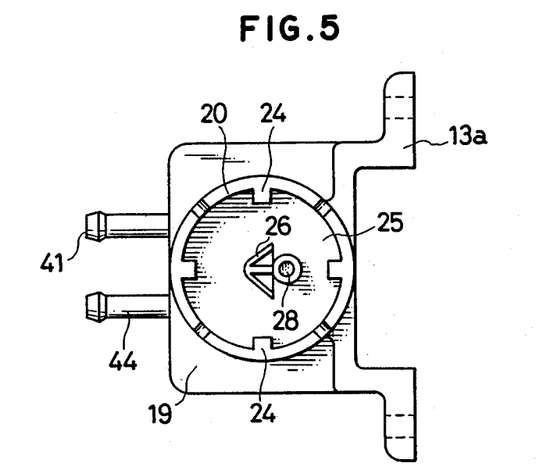
FIG. 5 is a plan view showing the second pumping unit shown in FIG. 3.

The second pumping unit 8 includes a vessel holder 20 provided on an upper member 19 of a body 13 consisting of the upper member 19 and a lower member 21 capable of detachably holding a neck 14 of the second vessel 7. The second pump 6 is provided in the lower member 21 and the second motor 5 is provided below and drives the second pump 6. The vessel holder 20 for holding the second vessel 7, as shown in FIGS. 2, 3 and 5, is a hollow cylinder open at the top. Its inner peripheral wall is provided with a plurality of axial ribs 24 each having a recessed portion 23. It has a liquid pool 25 formed at the bottom. A piercing needle 26 having a pointed end projects upright from the bottom of the liquid pool 25.

Figure 4:
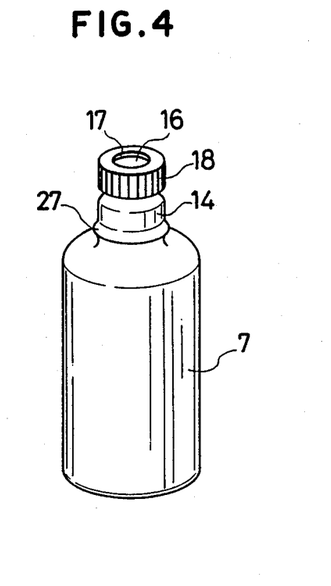
FIG. 4 is a perspective view showing an example of a vessel mounted in the second pumping unit.

FIG. 4 shows an example of the second vessel 7. As is shown, the second vessel 7 is bottle-like, having the previously mentioned neck 14, and it is preferably made of a synthetic resin. A second liquid (e.g., a liquid surface active agent) is sealed in the vessel by sealing the open end of the neck 14 with a thin film 15 (shown in FIG. 2). A screw cap 18 with an opening 17 is subsequently screwed with a protective plate 16 placed on the thin film 15.

To mount the second vessel 7 in the vessel holder 20, the protective plate 16 is removed in advance by removing the screw cap 18, then the screw cap 18 is screwed on again, and then with the second vessel 7 in an inverted state the neck 14 is inserted into the vessel holder 20. Consequently, the piercing needle 26 penetrates the opening 17 of the screw cap 18 and breaks the thin film 15. The second vessel 7 is further inserted until an annular ridge 27 formed on the outer periphery of the neck 14 is received in the recessed portions 23 of the axial ribs 24, whereby the second vessel 7 is mounted in a predetermined position. When the second vessel 7 is mounted in this way, a slight gap is formed between the inner periphery of the vessel holder 20 and the neck 14 due to the presence of the axial ribs 24, the gap communicating the liquid pool 25 beneath the neck 14 with the outside via a plurality of apertures 53 (shown in FIG. 3). Thus, the second liquid in the second vessel 7 flows through the broken portion of the thin film 15 and along the piercing needle 26 into the liquid pool 25 until the liquid level of the liquid pool 25 is elevated up to the lower end of the neck 14. At that point no further air can enter the second vessel 7, whereupon the downflow of the second liquid is stopped. The liquid pool 25 thus is filled up with the second liquid. The second liquid filling the liquid pool 25 flows through a flow-down path 28, which has its inlet open at the bottom of the liquid pool 25, into a pumping chamber 29 of the second pump 6 provided in the lower member 21.

If an elastic rubber member is used as the thin film 15, when the second vessel 7 has been detached from the vessel holder 20 for the purpose of interchanging it with another one, the hole formed in the thin film by the piercing needle 26 closes due to its own elasticity, thereby making it possible to prevent the second liquid still remaining in the second vessel 7 from leaking out.

Figures 6, 7, 8:
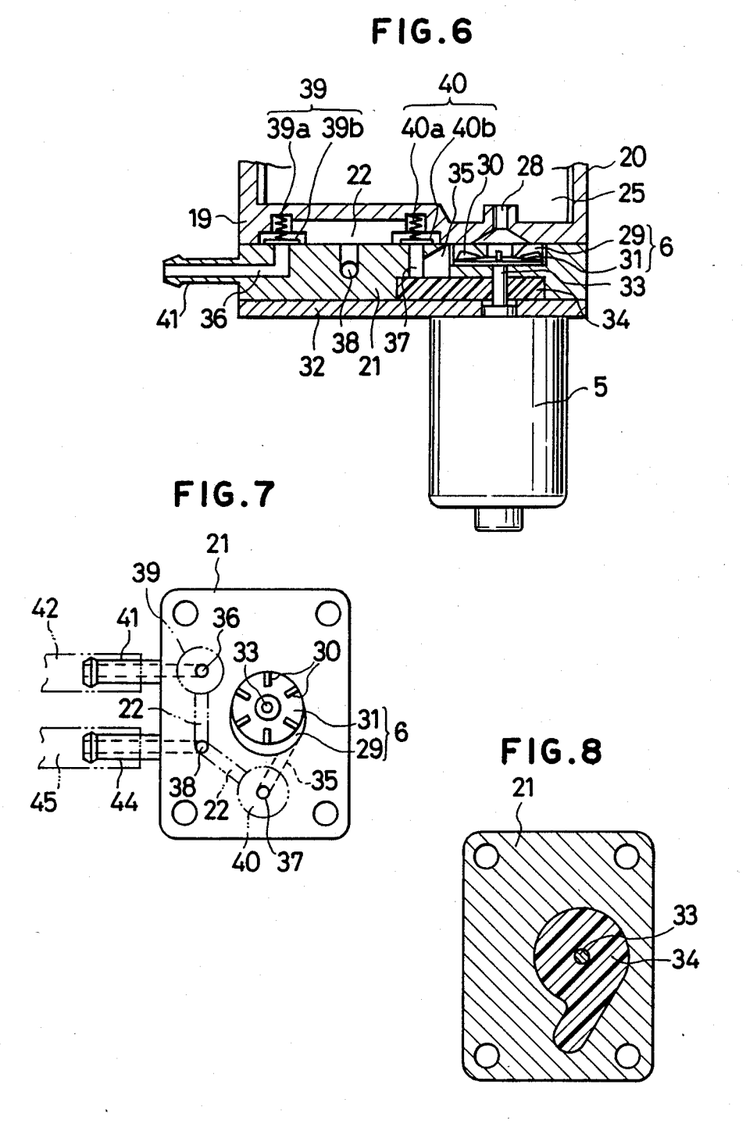
FIG. 6 is a sectional view showing a liquid flow path in the second pumping unit.
FIG. 7 is a plan view showing a lower member of the second pumping unit.
FIG. 8 is a sectional view taken along line VIII—VIII in FIG. 2.

The pumping chamber 29, as shown in FIG. 7, has a substantially circular sectional profile. A shaft 33 of the second motor 5 provided on the underside of a lower lid 32 (shown in FIG. 6) of the lower member 21 penetrates the lower lid 32 and a packing 34 and projects into the neighborhood of the center of the pumping chamber 29 as shown in FIGS. 2 and 6. To the projecting portion of the shaft 33 is secured a rotor 31 of the second pump 6 which has a plurality of radially arranged vanes 30. The flow-down path 28 communicating with the liquid pool 25 of the vessel holder 20 has an outlet open at a position corresponding to the center of the shaft 33. The inner periphery of the pumping chamber 29 has a discharge port 35 communicating with a joining chamber 22 with a second flow path 37.

The joining chamber 22 consists of a substantially L-shaped groove formed in the lower surface of the upper member 19 as shown by imaginary lines in FIG. 7. The lower member 21 which closes the lower opening of the groove has a first flow path 36 formed at a position corresponding to one end of the groove, the previously mentioned second flow path 37 formed at a position corresponding to the other end of the groove, and an outlet 38 formed at a position corresponding to an intermediate bend of the groove. A first unidirectional valve 39 is provided in the first flow path 36, and a second unidirectional valve 40 is provided in the second flow path 37 communicating with the discharge port 35 of the second pump 6 (FIG. 6). The structure of the first unidirectional valve 39 is such that a first disk-like valve body 39b is urged with a determined pressure against a valve seat (open section) of the first flow path 36 by the biasing force of a first spring 39a. Thus, if the pressure of the liquid pumped to the first flow path 36 is higher than the pressure in the joining chamber 22, the first valve body 39b is raised by the pressure of the liquid against the biasing force of the first spring 39a, thus permitting the flow of the liquid from the open section in the open state into the joining chamber 22. If the pressure in the joining chamber 22 is higher, on the other hand, the first valve body 39b is held in close contact with the valve seat to block the flow of the liquid from the joining chamber 22 through the first flow path 36. Like the first unidirectional valve 39, the structure of the second unidirectional valve 40 is such that a second disk-like valve body 40b is urged against a valve seat of the second flow path 37 by a second spring 40a. Thus, if the liquid pumped to the second flow path 37 is under a higher pressure than the pressure in the joining chamber 22, it is permitted to enter the joining chamber 22. However, if it is under a lower pressure, its flow from the joining chamber 22 to the second flow path 37 is blocked.

To a connector 41 extending from the first flow path 36 of the joining chamber 22 is connected, as seen in FIG. 1, one end of a flow-path 42 (consisting, for instance, of a vinyl tube) the other end of which is connected to a discharge port 43 of the first pumping unit 4. Also, to a connector 44 extending from the outlet 38 of the joining chamber 22 is connected, as seen in FIG. 1, one end of a feed-out duct 45 (consisting, for instance, of a vinyl tube), the other end of which is connected to the jet nozzle 10. Designated at 13a (shown in FIG. 8) is a bracket for securing the second pumping unit 8 to the engine compartment.

In the washing liquid jet device having the above structure, in case where the first vessel 3 is filled with a diluted washing solution as the first liquid and the second vessel 7 is filled with a liquid surface active agent as the second liquid, by operating only the first motor 1 of the first pumping unit 4, the first pump 2 pumps out the diluted solution to the first flow path 36 of the joining chamber 22. The first unidirectional valve 39 is opened by the pressure of the diluted solution, so that the diluted solution enters the joining chamber 22. Since the second unidirectional valve 40 is closed in this state, the diluted solution entering the joining chamber 22 is pumped from the outlet 38 through the feed-out duct 45 to the jet nozzle 10. Thus, only the diluted solution is jetted from the jet nozzle 10 against the windshield 11. As is shown, by operating only the first pumping unit 4, only the diluted solution is jetted. Thus, only the first pumping unit 4 need be operated when removing a slight amount of mud or the like from the windshield 11.

In case when a thick oil film adheres to the windshield 11, only the second motor 5 of the second pumping unit 8 is operated, and the first motor 1 of the first pumping unit 4 is held inoperative. As a result, the rotor 31 of the second pump 6 is rotated by the second motor 5 to allow the liquid surface active agent in the second vessel 7 (which has been supplied to the liquid pool 25) to be withdrawn into the pumping chamber 29 and pumped from the discharge port 35 to the second flow path 37 (FIG. 6). Thus, the second unidirectional valve 40 of the joining chamber 22 is opened to admit the liquid surface active agent into the joining chamber 22. Since the first unidirectional valve 39 is closed in this state, the liquid surface active agent entering the joining chamber 22 is supplied from the outlet 38 through the feed-out duct 45 to the jet nozzle 10. Thus, only the liquid surface active agent is jetted from the jet nozzle 10 against the windshield 11. By operating the wiper in this state, the oil film is removed by the liquid surface active agent. When only the first pumping unit 4 is operated in this state, only the diluted solution is jetted against the windshield 11 as noted above, so that it is possible to wash away the liquid surface active agent having been jetted prior to the diluted solution together with the contamination.

A thin oil film adhering to the windshield 11 may be effectively removed by jetting a diluted washing liquid containing a surface active agent. In this case, the first and second pumping units 4, and 8 are both operated at the same time. With the operation of the first pumping unit 4 the diluted solution is pumped into the first flow path 36 of the joining chamber 22, so that the first unidirectional valve 39 is opened to admit the diluted solution into the joining chamber 22. Also, with the operation of the second pumping unit 8, the liquid surface active agent is pumped to the second flow path 37, so that the second unidirectional valve 40 is opened to admit the liquid surface active agent into the joining chamber 22. Thus, in the joining chamber 22 the liquid surface active agent entering from the second flow path 37 is diluted by the diluted solution entering from the first flow path 36. The diluted liquid surface active agent is supplied from the outlet 38 of the joining chamber 22 through the feed-out duct 45 to the jet nozzle 10 to be jetted against the windshield 11. Thus, by operating the wiper in this state, it is possible to wipe off an oil film adhering to the windshield 11. The strength of the first and second springs 39a and 40a of the first and second unidirectional valves 39 and 40 of the joining chamber 22 and the liquid supply pressure of the first and second pumping units 4 and 8 are set such that both the first and second unidirectional valves 39 and 40 are opened when the first and second pumping units 4 and 8 are operated at the same time.

Figure 9:
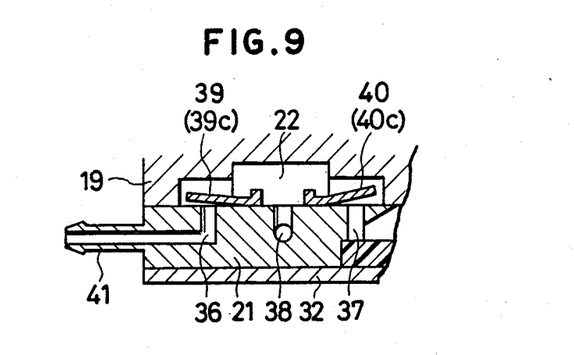
FIG. 9 is a sectional view showing a different embodiment of a unidirectional valve of the second pumping unit.

FIG. 9 shows an another embodiment of the first and second unidirectional valves 39 and 40 provided at the valve seats of the first and second flow paths 36 and 37. At the seat of the flow path 36 (or 37), a circular elastic thin film valve 39c (or 40c) made of rubber or a synthetic resin is provided with one end secured to the outer periphery of the valve seat and the other end (free end) adapted to cover the valve seat. The free end is deformed so as to form a slight gap with respect to the valve seat (open surface) when there is no applied pressure. Thus, with this embodiment the first and second flow paths 36 and 37 are in communication with the outlet 38 through the joining chamber 22 when both the first and second pumping units 4 and 8 are inoperative. When the first pumping unit 4 is operated, the dilution solution in the first vessel 3 flows through the connector 41, raises the first thin film valve 39c, flows into the joining chamber 22, and is pumped out toward the outlet 38. At this time, the second thin film valve 40c is held in close contact with the valve seat by the pressure of the diluted solution, thus blocking the reverse flow of the diluted solution to the second flow path 37. When the second pumping unit 8 is operated, the liquid surface active agent in the second vessel 7 is pumped out by the second pump 6 through the joining chamber 22 toward the outlet 38, so that the first thin film valve 39c is urged against the valve seat by the pressure in the joining chamber 22, thus blocking the reverse flow of the liquid surface active agent to the first flow path 36.

When the operation of the pumping system is stopped, the pumping of the individual liquids is stopped, and the free ends of the first and second thin film valves 39c and 40c are separated from the valve seats by their own elasticity. As a result, if there is any space in the first and second flow paths 36, 37, the joining chamber 22, etc., the liquid in the feed-out duct 45 flows reversely, and it is possible to prevent contamination due to retained liquid in the feed-out duct 45 or freezing in the winter season, which might cause rupture or operation failure of the jet nozzle 10.

Figure 10:
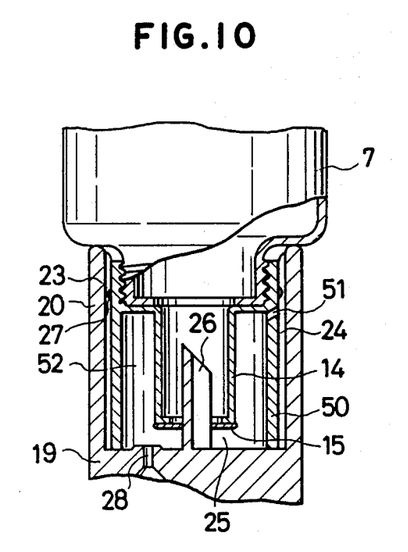
FIG. 10 is a sectional view showing another embodiment of a vessel holder of the second pumping unit according to the invention.
Figure 11:
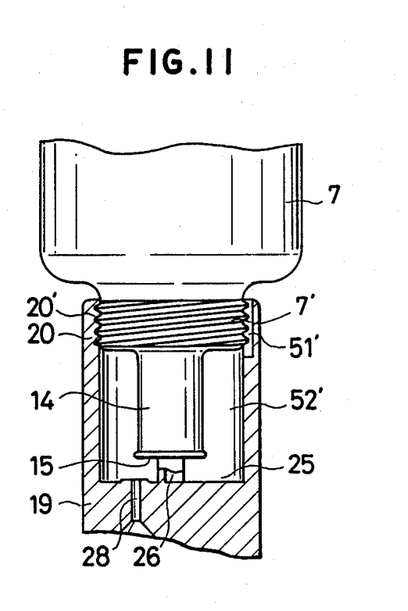
FIG. 11 is a sectional view showing still another embodiment of the vessel holder of the second pumping unit according to the invention.

FIGS. 10 and 11 illustrate embodiments in which the liquid in the feed-out duct 45 can effectively flow reversely.

In the embodiment of FIG. 10, the second vessel 7 is provided around the neck 14 thereof with a cylindrical member 50 which is concentric with the neck 14 and has a larger diameter and a greater length than those of the neck 14. When the second vessel 7 is attached to the vessel holder 20, the liquid in the second vessel 7 is always supplied into the liquid pool 25 through the piercing needle 26 to a depth of the position of the thin film 15. In this state, when the operation of the second pumping unit 8 is stopped, the liquid in the feed-out duct 45 flows reversely into the joining chamber 22, the pumping chamber 29, the flow-down path 28, and the liquid pool 25 successively and is accommodated within an annular space 52 defined between the inner peripheral wall of the cylindrical member 50 and the neck 14 of the second vessel 7. The liquid accommodated within the annular space 52 can be re-used by operating the second pumping unit 8. Similarly when the operation of the first pumping unit 3 is stopped, the liquid flows reversely and is accommodated within the annular space 52. Designated by a numeral 51 in FIG. 10 is an air vent for allowing the air in the annular space 52 to escape when the liquid has been accommodated within the annular space 52. The cylindrical member 50 may optionally be fixed to the side of the vessel holder 20.

In the embodiment of FIG. 11, a portion of the second vessel 7 to be attached to the vessel holder 20 is provided with an external thread 7' and the corresponding portion of the vessel holder 20 is provided with an internal thread 20' which can mesh with the external thread 7'. In the state of the external and internal threads 7' and 20' meshing with each other, the second vessel 7 is attached to the vessel holder 20. In this state, the thin film 15 is pierced by the piercing needle 26 and kept at a distance from the bottom of the liquid pool 25. Since the diameter of the neck 14 of the second vessel 7 is much smaller than the inside diameter of the vessel holder 20, an annular space 52 is formed similarly to the embodiment of FIG. 10 between the inner peripheral wall of the vessel holder 20 and the outer peripheral wall of the neck 14, thereby accommodating therein the liquid flowing reversely from the feed-out duct 45 when the operation of the pumping units 3, 8 is stopped. Furthermore, the portion of the vessel holder 20 formed with the internal thread 20' is provided with a vertical slit 51' serving as an air escaping passage which fulfills its function when the liquid flows into the annular space 52.

In the embodiments of FIGS. 10 and 11, since the liquid in the feed-out duct 45 can flow reversely with the stopping operation of the pumping units 3, 8, as described above, the drawbacks suffered by the liquid still remaining within the feed-out duct 45 can be eliminated.

As has been shown, according to the invention either the first or the second liquid or a mixture of these liquids may be jetted against the windshield 11 for washing the same by selectively operating the first or second pumping unit 4 or 8 or both the first and second pumping units 4 and 8 at the same time, depending on the degree of contamination of the windshield. The above operation can be obtained by independently providing first and second switches 46 and 47 (see FIG. 1) for operating the respective first and second pumping units 4 and 8 at the driver's seat of the car.

However, it is possible to make the arrangement such that, by operating the second pumping unit 8, the first pumping unit 4 is automatically rendered operative after the second pumping unit 8 is rendered inoperative. In the embodiment shown in FIG. 1, the second switch 47 of the second pumping unit 8 is a see-saw switch having first and second contacts 47a and 47b, with the first contact 47a connected to the second motor 5 of the second pumping unit 8 and a reset terminal of a timer 48 and the second contact 47b connected to a trigger terminal of the timer 48. The output side of the timer 48 is connected to the first motor 1 of the first pumping unit 4, and a power source terminal of the timer 48 is connected to an engine switch of the car. With this circuit connection, when the second switch 47 is switched to render the first contact 47a operative with the engine switch "on" (i.e., in the running state), the second pumping unit 8 is rendered operative to cause the second liquid (i.e., a liquid surface active agent) to be jetted against the windshield 11. When the second switch 47 is switched to render the first contact 47a non-conductive, the second pumping unit 8 is rendered inoperative, while the second contact 47b is rendered conductive. Thus, power is supplied from the output terminal of the timer 48 for a time period preset by the timer 48, so that the first motor 1 of the first pumping unit 4 is rendered operative to cause the first liquid (i.e., diluted solution) to be jetted against the windshield 11.

Further, when the output terminal of the timer 48 is connected to a wiper drive motor 49, the wiper can be operated simultaneously by the output of the timer 48, so that there is no need for separately providing any particular power switch.

As has been shown in the foregoing, the washing liquid jet device according to the invention requires two pumping units 4 and 8. However, a window washer unit already provided in the car may be used as one of the two pumping units. Further, the jet nozzle 10 and piping may be those provided in the car. More particularly, the piping leading from the pump of the window washer unit to the jet nozzle 10 may be cut, the cut piping on the pump side may be connected to the first flow path 36 of the joining chamber 22, and the cut piping on the side of the jet nozzle 10 may be connected to the outlet 38 of the joining chamber 22. Thus, the washing liquid jet device according to the invention may either be provided in a car assembly line or be easily subsequently mounted.

Further, while the first vessel 3 of the first pumping unit 4 has been described as being stationary, it is possible to use as the first vessel one of detachable cartridge type preliminarily filled with liquid like the second vessel 7 of the second pumping unit 8. Further, the first liquid to be charged into the first vessel 3 of the first pumping unit 4 is not limited to the diluted solution, and it is possible to charge therein water or other substitute liquids as well.

Further, while the second vessel 7 of the second pumping unit 8 has been described as being detachable, it is possible to use as the second vessel a stationary one like the first vessel 3. Further, the second liquid is not limited to that of the second vessel 7, and it is possible to use any other suitable liquid, i.e., an aqueous solution containing an anti-fogging agent or a frost remover.

Furthermore, the present invention is not limited to a washing liquid jet device for an automobile windshield, and is applicable to a similar device for an automobile rear window as well.

As has been described in the foregoing, according to the invention by operating only first pumping unit, only the liquid in the first vessel can be jetted; by operating only the second pumping unit, only the liquid in the second vessel can be jetted, and, by operating both the first and second pumping units at the same time, the liquids in the first and second vessels can be mixed in the joining chamber to jet the resultant mixture. It is thus possible to fill the first vessel with a diluted solution and fill the second vessel with a high concentration surface active agent solution, so that, when the window glass is dirty with mud or the like which can be sufficiently washed with water only the diluted solution can be jetted from the jet nozzle by operating only first pumping unit, while, when a dense oil film adheres to the windshield, the second pumping unit may first be operated to remove the oil film and then the first pumping unit may be operated to jet the diluted solution to wash away the removed contaminant. As has been shown in the foregoing, it is possible to jet either of two different liquids selectively or jet both the liquids as a mixture, so that effective washing can be obtained by jetting washing liquid in accordance with the kind of dirt adhering to the glass.

Further, since the car is already provided with a window washer unit and a jet nozzle, it is possible to construct the washing liquid jet device according to the invention by merely additionally providing a single pumping unit together with a small amount of wiring and piping, and there is no need for providing any electromagnetic valve or the like at this time. Thus, the device is of simple construction and may be readily mounted.

As has been described in the foregoing, according to the invention it is possible to maintain the automobile windshield clean at all times to permit safe driving of the car even under poor visibility conditions such as during rainy weather or at night. The washing liquid jet device according to the invention is thus highly useful in practice both commercially and in terms of traffic safety.

What is claimed is:

1. A washing liquid jet device for an automobile window glass, said device comprising:
   (a) a vessel holding means for detachably holding upside down a vessel containing washing liquid and having a neck containing a seal, said vessel holding means including:
      (i) a cylindrical holding portion having an open top for receiving the neck of the vessel to hold the vessel upside down;
      (ii) a pool portion disposed on the lower surface of said cylindrical holding portion for storing the washing liquid therein;
      (iii) a piercing needle portion projecting from the bottom of said pool portion for piercing through the seal in the neck of the vessel to permit the washing liquid to flow into said pool portion; and
      (iv) communication means formed in the inner periphery of said cylindrical holding portion for allowing said pool portion to communicate with the atmosphere and
   (b) pumping means in fluid communication with said pool portion for pumping out the washing liquid through a conduit to a nozzle located above said pool portion, said nozzle having a jet port directed toward a window glass,
   whereby, when said pumping means is turned off, washing liquid contained in said conduit flows back into said pool portion.

2. The washing liquid jet device according to claim 1 wherein said pool portion includes an annular space defined between the inner periphery of said cylindrical holding portion and the outer periphery of the neck of the vessel.

3. The washing liquid jet device according to claim 1 wherein said cylindrical holding portion comprises a concentric cylindrical member of a diameter larger than that of the neck of the vessel for retaining the neck of the vessel, the outer periphery of said cylindrical member and the inner periphery of said cylindrical holding portion comprising a portion of said communication means.

4. The washing liquid jet device according to claim 1 wherein the inner periphery of said cylindrical holding portion is provided with a plurality of vertical ribs for holding the neck of the vessel at a distance from the inner periphery of said cylindrical holding portion, said distance comprising a portion of said communication means.

5. The washing liquid jet device according to claim 1 wherein the inner periphery of said cylindrical holding portion is provided with a plurality of vertical slits, said plurality of vertical slits comprising a portion of said communication means.

* * * * *